No. 613,310. Patented Nov. 1, 1898.
H. M. REICHENBACH.
FOLDING CAMERA.
(Application filed Jan. 19, 1898.)
(No Model.) 2 Sheets—Sheet 1.

Witnesses:
H. C. H. Cooper.
C. G. Crannell.

Inventor:
Henry M. Reichenbach,
By Geo. B. Selden,
atty.

THE NORRIS PETERS CO., PHOTO-LITHO., WASHINGTON, D. C.

No. 613,310. Patented Nov. 1, 1898.
H. M. REICHENBACH.
FOLDING CAMERA.
(Application filed Jan. 19, 1898.)
(No Model.) 2 Sheets—Sheet 2.
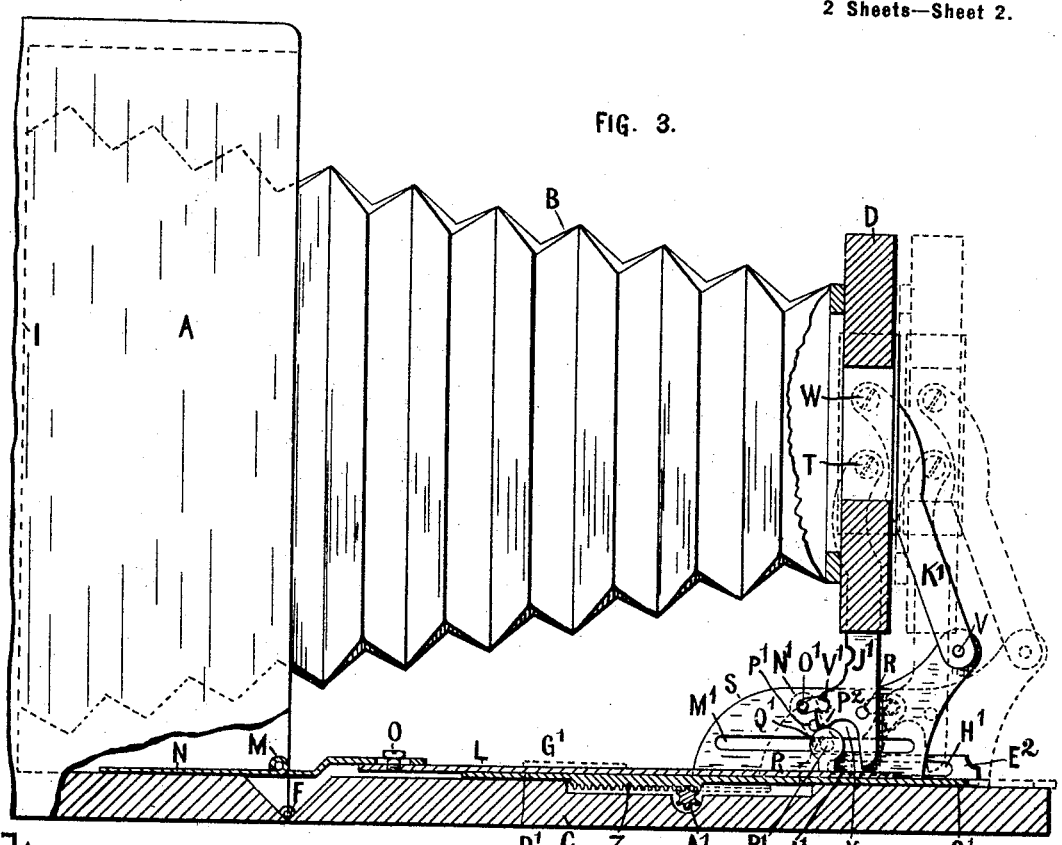
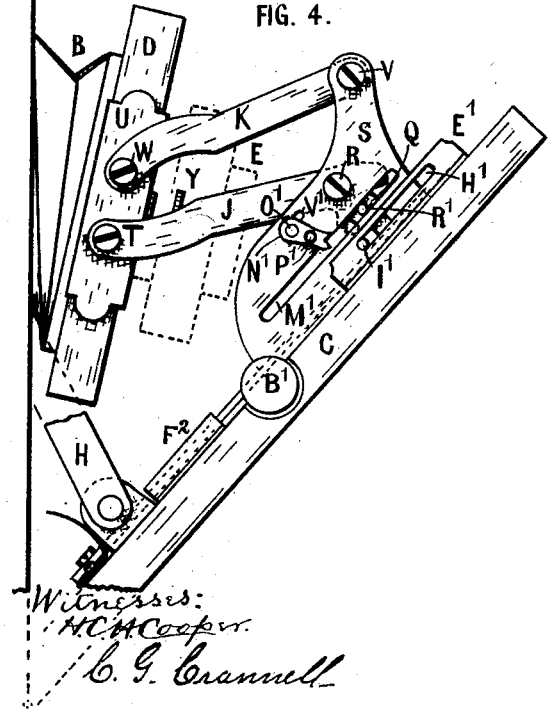
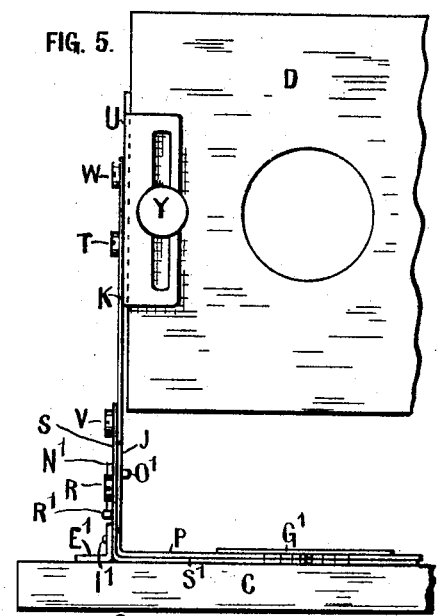
Witnesses:
H. C. H. Cooper
C. G. Crannell
Inventor:
Henry M. Reichenbach,
By Geo. B. Selden, atty.

UNITED STATES PATENT OFFICE.

HENRY M. REICHENBACH, OF ROCHESTER, NEW YORK, ASSIGNOR, BY MESNE ASSIGNMENTS, TO THE REICHENBACH, MOREY & WILL COMPANY, OF SAME PLACE.

FOLDING CAMERA.

SPECIFICATION forming part of Letters Patent No. 613,310, dated November 1, 1898.

Application filed January 19, 1898. Serial No. 667,126. (No model.)

*To all whom it may concern:*

Be it known that I, HENRY M. REICHENBACH, a citizen of the United States, residing at Rochester, New York, have invented an Improved Folding Camera, of which the following is a specification, reference being had to the accompanying drawings.

My present invention relates to an improved folding camera in which the bellows is distended and the lens brought into proper focal relation with the sensitive surface by the opening of the front.

My invention is fully described and illustrated in the following specification and the accompanying drawings, the novel features thereof being specified in the claims annexed to the said specification.

Figure 1:
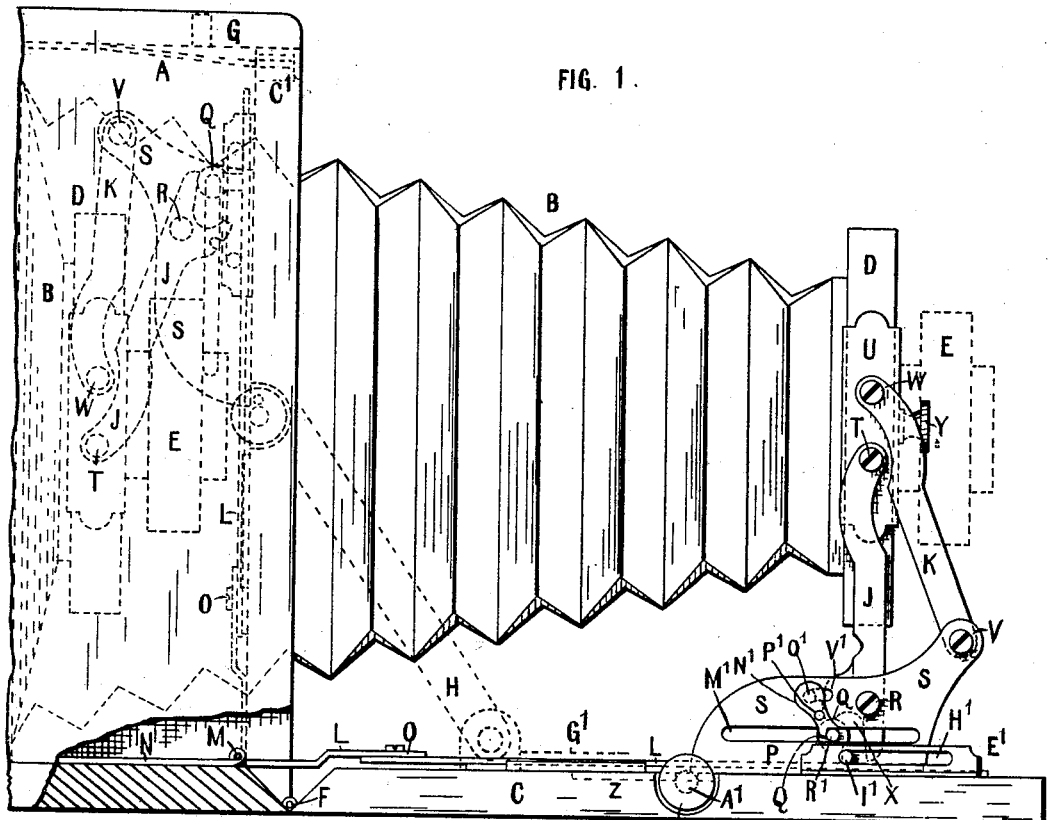
Figure 2:
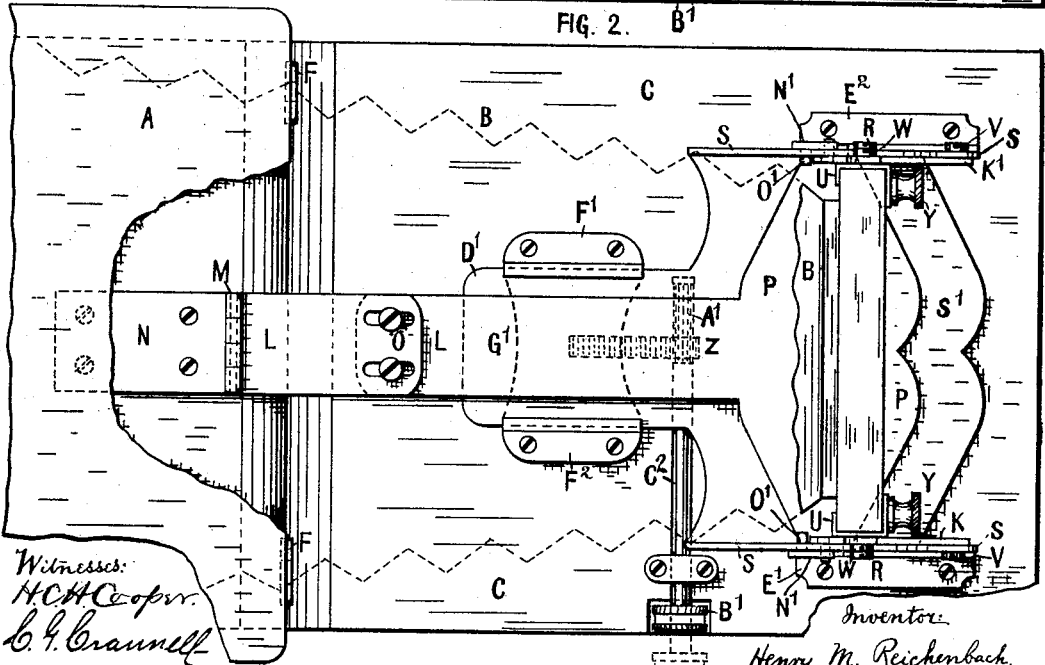

In the accompanying drawings, representing my improved folding camera, Figure 1 is a side elevation showing the bellows distended and lens in position for exposure in full lines and indicating the folded position in dotted lines. Fig. 2 is a plan view of the camera extended, the bellows being omitted. Fig. 3 is a side elevation, partially in central longitudinal section, showing the parts beyond the plane of section. Fig. 4 represents the position of the front, lens-board, and connecting mechanism when the camera is partly opened or closed. Fig. 5 is a partial front elevation.

In the accompanying drawings, A is the body of the camera, of any suitable size or dimensions and provided with any ordinary or preferred plate or film holder or other device for carrying a sensitive surface.

B is the bellows; C, the folding front; D, the lens-board, and E the lens, which may be provided with any suitable shutter. The front is hinged to the body at F, so that it may be folded into the body, as represented at C', Fig. 1; but when it is desired to make an exposure the opening of the front automatically brings the lens with the bellows extended into position for exposure on objects at some definite predetermined distance — say one hundred feet. In the ordinary folding camera as usually constructed the front is opened, and then the operator has to draw the bellows forward and by a clamp of some kind fix the lens-board and lens in place on the open front for an exposure. In my improved camera these last operations are entirely dispensed with, and the simple opening of the front distends the bellows and brings the lens into position for an exposure. The construction, however, also admits of adjustment for focus at different distances, if desired.

G, Fig. 1, is a catch of any usual or preferred kind by which the front is locked in the folded position. The thumb-piece of the catch is preferably concealed under the leather with which cameras are now ordinarily covered. When folded down or opened on the hinge F, the front is held in place by the usual diagonal braces H H. (Shown in dotted lines in Figs. 1 and 4.) The body of the camera is provided with a suitable frame, (indicated at I, Fig. 3,) to which the rear end of the bellows is attached in any suitable or preferred way. It will be observed from Fig. 1 that the front when folded in is parallel to the lens-board, but when extended lies at right angles thereto. The lens-board is so connected with the front that as the latter is same time drawn forward, the bellows disopened or folded down the lens-board is at the tended, and the lens brought into position for an exposure. It will be observed that the usual slides or ways for the lens-board and bellows are entirely dispensed with. The folding down of the front automatically brings the lens into the proper relation with the sensitive surface and distends the bellows by means of the mechanism by which the lens-board is connected to the front and the body. In the construction shown this mechanism consists of levers J J', links K K', pivoted to the lens-board and to a suitable bracket on the front, and the hinged connection L, hinged at M to the body. The hinges F and M are out of line with each other, and this arrangement gives the connection L a longitudinal movement relative to the front when the latter is swung on its hinges in either direction, which is utilized, through the levers J J' and links K K', to give the lens-board the requisite movement.

N is a plate secured to the upper surface of the base-board of the body, to which the connection L is hinged at M. The connection L extends forward along the front, being provided with an adjustable joint O, if preferred, and is connected at its forward end with the plate P, extending laterally in each direction, and having the ears Q Q' turned up on its outer edges. When the front is folded up, the plate P will slide forward on it in consequence of the different locations of the pivotal points F and M, and this motion of the plate relative to the front acts by its ears Q Q' on the lower ends of the levers J J', so as to throw their upper ends back toward the camera, and thus to impart the requisite movement of the lens-board. The levers J J', one on each side of the lens-plate, are pivoted at R to the bracket S, supported by the front. At their upper ends the levers J J' are pivoted at T to the lens-board D or the clip U thereon. The links K K' are pivoted at V to the bracket S and at their upper ends at W to the lens-board D or the clip U. The pivots W are above the pivots T. At their lower ends the levers J J' are provided with notches X, Fig. 3, adapted to engage with the lugs or ears Q Q', so that as the plate P slides forward on the front the upper ends of these levers are thrown backward, carrying the lower portion of the lens-board with them, until by the conjoined action of the levers J J' and links K K' the lens-board is finally, on the completion of the folding movement, placed back within the body with the bellows closed up, as indicated by the dotted lines in Fig. 1. During the first portion of the closing movement the levers J J' swing the lower part of the lens-board rapidly inward, so that it occupies a position at a considerable angle with the vertical axis of the body; but during the latter part of the movement the links K K' as the front closes up on the body serve to bring the lens-board into the vertical position parallel with the body and with its original position. During the opening of the front these movements are of course exactly reversed.

The accompanying drawings are made full size from a four-by-five camera in practical use; but it will be understood that the application of my invention to cameras of other sizes will only require some changes in the proportions.

As already stated, the pivots T and W may be inserted directly in the lens-board D; but to provide for up-and-down adjustment of the lens the clips U are applied on each side of the lens-board, and the pivots T and W are inserted in the clips, which reach around the front side of the lens-board, and are provided with slots and the clamping-screws Y, so that thus provision is made for the vertical adjustment of the lens relative to the sensitive surface and the axis of the camera. The lens-board can slide up or down in the clips U, being secured in any desired position by the clamp-screws Y.

So far the bracket S has been treated as though it were a fixture on the front, and it might be so in a camera which was intended to operate on objects always at the same distance away; but in order to provide for adjusting the focus for objects at varying distances from the camera the bracket S is made adjustable on the front in any suitable manner. In the construction shown the bracket S is provided with a rack Z, engaging with a pinion A', operating by the milled head B' and shaft $C^2$. These parts are sunk in a recess in the front, and the pinion A' is made long, so that the head B' may be drawn out laterally beyond the edge of the front, as indicated by the dotted lines in Fig. 2. The shape of the bracket S will be understood from Figs. 1 and 2. It consists of a horizontal plate S', having the upturned ears S on each side, and a rearward extension D', to the lower side of which the rack Z is attached. It is arranged to slide on the front in suitable guides $E'$ $E^2$ $F'$ $F^2$. The guides $F'$ $F^2$ may be connected together over the connection L by the strap G', Fig. 2, which holds the rack Z in mesh with the pinion A'. The guides or ways $E'$ $E^2$ are angle-plates fastened to the front and arranged on each side of the upturned ears S. They are provided with slots H', Fig. 1, in which the pins I', inserted in the ears S, slide. Any other suitable construction may be adopted in this respect. When the bracket S is racked back, so that the pins I' occupy the rear ends of the slots H', and the camera is unfolded the focus will be set for objects at some given distance away—say the far distance, or one hundred feet. For nearer objects the lens requires to be racked forward by the milled head B', any suitable pointer and scale being provided; but when racked forward the engagement between the lower ends of the levers J J' and the ears Q Q' will be lost. The levers will be unsupported, and therefore it is necessary to lock them to the bracket. This I accomplish by providing the ears Q Q' with pins R', which project through slots M' in the sides of the bracket S and act to swing pivoted dogs N' to engage pins O' with notches V' in the levers J J'.

The operation will be understood from Figs. 1 and 3. The dogs are pivoted at P' to the ears S. When the bracket S S' is moved forward by the milled head B' and the rack and pinion Z and A', the pins R' on the ears Q Q' swing the dogs N' so that the pins O' are engaged in the notches V' in the levers J J', and the latter are then locked in position during the further movement of the bracket S, so that they sustain the lens-board rigidly. From Fig. 3 it will be seen that the rear side $P^2$ of the notch X is cut away, so as to bear on the top of the ear Q', and that the levers J J' are held upright by this construction when the camera is opened focused for the predetermined distance. When the bracket S is racked forward, the lugs $P^2$ move away from the ears, and the dogs N' are used to engage the pins O' in the notches V' to hold the levers J J' upright. At their lower ends the dogs N' are provided with a notch or recess, which engages with the pins R' in the ears. When the bracket moves forward, the pins R' remain stationary, and the contact of the lower ends of the dogs N' with these pins causes the upper ends of the dogs to swing forward and to engage the pins O' in the notches V'. Exactly the reverse movement takes place when the bracket is racked back. The milled head B' is located in a recess in the front, so that it must be drawn out laterally, as indicated by the dotted lines in Fig. 2, in order to adjust the focus, and when drawn out the head prevents the closing of the camera, so that the operator is notified that he should rack the bracket back and push in the milled head before he can shut up his instrument. The bracket is made to slide under a certain amount of friction, so as to prevent its being moved forward by the plate P when the camera is folded up. The joint O serves to adjust the length of the connection L; but it may be omitted in carefully-constructed instruments. A notch may be cut in the rear sides of the levers J J' to prevent contact with the pins O' during the folding movement.

So far as I am aware I am the first to combine the bellows and folding front of a camera by mechanism which distends the bellows automatically when the front is opened, either with or without mechanism for focal adjustment.

I claim—

1. The combination with the body of a photographic camera, of the folding front, the extensible bellows and mechanism for automatically distending the bellows when the front is opened, substantially as described.

2. The combination with the body of a photographic camera, of the folding front, the extensible bellows, the lens-board, and suitable connections between the front and the lens-board whereby the lens is advanced and the bellows distended into operative position, substantially as described.

3. The combination with the body of a photographic camera, of the hinged front, the lens-board, the bracket supported on the front, the pivoted levers between the bracket and the lens-board, and the hinged connection between the body and the bracket, substantially as described.

4. The combination with the body of a photographic camera, of the folding front, the extensible bellows and mechanism for automatically distending the bellows when the front is opened, and mechanism for adjusting the focus, substantially as described.

5. The combination with the body and folding front of a photographic camera, of the bracket supported on the front, the extensible bellows provided with the lens-board, the pivoted levers and links between the bracket and the lens-board, and a connection hinged to the body out of line with the pivot of the front and adapted to operate the levers which sustain the lens-board, substantially as described.

6. The combination with the body and folding front of a photographic camera, of the adjustable bracket supported on the front, the extensible bellows provided with the vertically-adjustable lens-board, the pivoted levers and links between the bracket and the lens-board, a connection hinged to the body out of line with the pivot of the front and adapted to operate the levers which sustain the lens-board, and mechanism for adjusting the bracket to secure the proper focus, substantially as described.

7. The combination with the body and folding front of a photographic camera, of the adjustable bracket supported on the front, the extensible bellows provided with the vertically-adjustable lens-board, the pivoted levers and links between the bracket and the lens-board, a connection hinged to the body out of line with the pivot of the front and adapted to operate the levers which sustain the lens-board, mechanism for adjusting the bracket to secure the proper focus, and a locking device to retain the levers in position during the focal adjustment, substantially as described.

8. The combination with the body and folding front of a photographic camera, of the adjustable bracket supported on the front, the extensible bellows provided with the vertically-adjustable lens-board, the pivoted levers and links between the bracket and the lens-board, a connection hinged to the body out of line with the pivot of the front and adapted to operate the levers which sustain the lens-board, mechanism for adjusting the bracket to secure the proper focus, a locking device to retain the levers in position during the focal adjustment, and means for holding the lens-board in any position of its vertical adjustment, substantially as described.

9. The combination in a photographic camera, of the front, the bracket thereon, the lens-board, and the links and levers pivoted to the bracket and the lens-board out of line with each other, substantially as described.

10. The combination in a photographic camera, of the front, the bracket thereon, the links and levers pivoted to the bracket and the lens-board out of line with each other, and the sliding plate adapted to engage with the levers, substantially as described.

11. The combination with the front C of the lens-board D, the bracket S, the levers J J', the links K K', and the sliding plate P having lugs Q, substantially as described.

12. The combination with the front C, of the vertically-adjustable lens-board D, the bracket S, the levers J J' and links K K', the clips U, and the sliding plate P having lugs Q, substantially as described.

13. The combination with the front C of the lens-board D, the adjustable bracket S, means for adjusting the bracket, levers J J', links K K', and the sliding plate P having lugs Q, substantially as described.

14. The combination with the front C of the lens-board D, the adjustable bracket S, means for adjusting the bracket, levers J J', links K K', the sliding plate P having lugs Q, and means for locking the levers to the bracket during its adjustment, substantially as described.

15. The combination with the front C of the lens-board D, the adjustable bracket S, means for adjusting the bracket, levers J J', links K K', the sliding plate P, having lugs Q, and the pivoted dog N', substantially as described.

HENRY M. REICHENBACH.

Witnesses:
  GEO. B. SELDEN,
  H. C. H. COOPER.